US012765537B2

(12) United States Patent
Kletzli et al.

(10) Patent No.: US 12,765,537 B2
(45) Date of Patent: *Oct. 20, 2026

(54) ELECTRONIC RAT TRAP WITH INTERNAL BARRIER STRUCTURE

(71) Applicant: Woodstream Corporation, Lancaster, PA (US)

(72) Inventors: Paul Michael Kletzli, Mount Joy, PA (US); Cory John Blair, Leighton, PA (US); Mark William Ebner, Lemoyne, PA (US)

(73) Assignee: Woodstream Corporation, Lancaster, PA (US)

(*) Notice: Subject to any disclaimer, the term of this patent is extended or adjusted under 35 U.S.C. 154(b) by 1 day.

This patent is subject to a terminal disclaimer.

(21) Appl. No.: 17/585,200

(22) Filed: Jan. 26, 2022

(65) Prior Publication Data

US 2022/0217968 A1 Jul. 14, 2022

Related U.S. Application Data

(62) Division of application No. 16/021,527, filed on Jun. 28, 2018, now Pat. No. 11,259,518.

(Continued)

(51) Int. Cl.
*A01M 23/38* (2006.01)
*A01M 23/16* (2006.01)

(52) U.S. Cl.
CPC ............ *A01M 23/38* (2013.01); *A01M 23/16* (2013.01); *A01M 2200/00* (2013.01)

(58) Field of Classification Search
CPC .. A01M 23/38; A01M 23/16; A01M 2200/00; A01M 23/00; A01M 31/002
See application file for complete search history.

(56) References Cited

U.S. PATENT DOCUMENTS 1,422,894 A * 7/1922 Skubinski ............. A01M 23/00 43/66
1,613,652 A * 1/1927 Earle ..................... A01M 23/00 43/66

(Continued)

FOREIGN PATENT DOCUMENTS

CN 1649491 A1 1/2003
CN 103081890 A1 5/2013

(Continued)

OTHER PUBLICATIONS

Extended European Search Report, Application No. 17857259.0-1216, Dated: Mar. 4, 2020, 9 pages.

(Continued)

*Primary Examiner* — Carly W. Lynch
(74) *Attorney, Agent, or Firm* — Barley Snyder

(57) ABSTRACT

An electronic rodent trap comprises a trap body, a high voltage killing circuit and a barrier. The trap body includes an upper wall assembly and a floor spaced from one another and joined by a left side and a right side. The upper wall assembly forms a fixed ceiling for the trap body. The trap body defines an open entrance end to provide rodents with access to an interior of the trap, and a closed baited end opposite the entrance end. The high voltage killing circuit includes at least three killing plates positioned on the floor in a spaced relationship to create a pathway for a rodent from the entrance end to the baited end. The plates include a first plate nearest the baited end, a second plate nearest the entrance end, and a center plate positioned between the first and second plates. The barrier extends downwardly from the trap ceiling into the trap interior and defines a bottom edge positioned above the center plate.

11 Claims, 6 Drawing Sheets

Related U.S. Application Data

(60) Provisional application No. 62/526,521, filed on Jun. 29, 2017.

(56) References Cited

U.S. PATENT DOCUMENTS

| | | | | |
|---|---|---|---|---|
| 1,782,661 | A * | 11/1930 | Midgett | A01M 23/00 43/66 |
| 3,197,916 | A | 8/1965 | Cole, Jr. et al. | |
| 3,341,967 | A | 9/1967 | Kelley | |
| 4,205,480 | A | 6/1980 | Gartner | |
| 4,363,184 | A | 12/1982 | Marcolina | |
| 4,799,982 | A | 1/1989 | Vicino | |
| 6,735,899 | B1 | 5/2004 | Anderson et al. | |
| 6,775,947 | B2 | 8/2004 | Anderson et al. | |
| 7,219,466 | B2 | 5/2007 | Rich et al. | |
| 7,690,147 | B2 | 4/2010 | Wetzel et al. | |
| 8,000,397 | B2 | 8/2011 | Cho et al. | |
| 8,793,929 | B1 * | 8/2014 | Walsh | A01M 25/00 43/131 |
| 8,857,102 | B2 * | 10/2014 | Weisberg | A01M 23/08 43/67 |
| 11,259,518 | B2 | 3/2022 | Kletzli et al. | |
| 2012/0167449 | A1 | 7/2012 | Frisch | |
| 2014/0020278 | A1 * | 1/2014 | Smith | A01M 23/36 43/79 |
| 2016/0302402 | A1 | 10/2016 | Fritzboger | |

FOREIGN PATENT DOCUMENTS

| | | | |
|---|---|---|---|
| EP | 1465482 | B1 | 1/2003 |
| WO | 8000397 | A1 | 3/1980 |
| WO | 9200671 | A1 | 1/1992 |
| WO | 03059057 | A1 | 7/2003 |
| WO | 2012054397 | A1 | 4/2012 |
| WO | 2016081865 | A1 | 5/2016 |

OTHER PUBLICATIONS

China Office Action and English translation, Application No. 201810722476.4, Dated: Sep. 30, 2020, 19 pages.

Bob Heile, et al: "July2016-plenary-closing-report-for 802-15; 15-16-0575-00-0000-july2016-plenary-closing-report- for-802-15", IEEE Draft; 15-16-0575-00-0000-JULY2016-PLENARY-CLOSING-REPORT-FOR-802-15, IEEE—SA Mentor, Piscataway, NJ USA, vol. 802.15, Aug. 24, 2016 (Aug. 24, 2016), pp. 1-157, XP068107883, Retrieved from Internet: URL:https://mentor.ieee.org/802.15/dcn/16/15-16-0575-00-0000-july2016-plenary-closing-report-for-802-15.ppt [retreived on Aug. 24, 2016].

* cited by examiner

ELECTRONIC RAT TRAP WITH INTERNAL BARRIER STRUCTURE

CROSS-REFERENCE TO RELATED APPLICATIONS

This application is a divisional application of co-pending U.S. patent application Ser. No. 16/021,527, filed Jun. 28, 2018, which is a non-provisional application based on U.S. Provisional Application No. 62/526,521, filed on Jun. 29, 2017 the entire disclosures of which are incorporated by reference herein.

FIELD OF THE INVENTION

The present invention is related to the field of electronic rodent traps and, more particularly, to an electronic rodent trap with an internal barrier structure that reduces escapes and thereby improves the rate of catch.

BACKGROUND

Electronic rodent traps like those disclosed in U.S. Pat. No. 6,735,899 ("the '899 patent") and U.S. Pat. No. 6,775,947 ("the '947 patent"), which are commonly owned by the assignee of the present invention, include a pair of spaced killing plates. When a rodent makes contact with both plates simultaneously, a killing cycle is triggered during which a high voltage pulse train is delivered to the plates to electrocute the rodent. The '899 patent and the '947 patent are hereby incorporated herein by reference in their entirety as if fully set forth herein.

It has been found that with some electronic rodent trap designs, particularly those for rats, the rat is able to escape by jumping rearward out of the trap when the killing cycle is initiated. This can occur even with a trap having a three-killing-plate design like that disclosed in U.S. Pat. No. 7,219,466 ("the '466 patent") which is also commonly owned by the assignee of the present invention; the '466 patent is also hereby incorporated by reference in its entirety as if fully set forth herein.

The trap design disclosed in the '899 patent includes multiple barrier elements but, having a hinged cover with a barrier, is best suited for mice. In addition, the barrier elements are placed with respect to only two plates, also best suited for mice.

Accordingly, a need exists for an electronic rat trap that reduces or eliminates rodent escapes during delivery of the high voltage killing cycle.

SUMMARY OF THE INVENTION

In view of the foregoing, the present invention is directed to an enclosure-type electronic rat trap having an interior accessed through a trap entrance and a rat pathway that leads from the entrance to a baited end opposite the entrance. Along the rat pathway between the entrance and the baited end are three plates in spaced relationship and a barrier that extends into and constricts the pathway to reduce the ability of the rat to escape the trap once the rat has traveled along the pathway sufficiently to engage the barrier.

As described in the '466 patent, the three plates are coupled to a high voltage circuit and include a center ground plate flanked on its forward or inner side with a first high voltage plate and on its rearward or outer side with a second plate that is electrically coupled with the first plate. As used herein, "forward", "front" and "inner" refer to that side nearest the closed or baited end of the trap, and "rearward", "rear" and "outer" refer to that side nearest the open or entrance end of the trap.

According to one embodiment, the barrier includes a baffle wall that extends downwardly from the trap ceiling into the trap enclosure so that the bottom edge of the baffle wall is positioned at a specific height above the plates and at a specific longitudinal distance from the forward edge of the center ground plate. More particularly, the vertical distance between the bottom edge of the baffle wall and the ground plate is between about 1.00 inch and about 2.50 inches, and preferably is about 1.78 inches, and the horizontal distance between the bottom edge of the baffle wall and a vertical plane in alignment with the forward edge of the center ground plate is at least 1.50 inches, and preferably is about 2.34 inches.

In use, when a killing cycle is initiated in response to the rat coming into contact with the forward and center plates simultaneously, the position of the rat in the trap is such that the bottom of the barrier pins the torso of the rat against the floor so that it cannot jump up in an effort to move rearwardly and escape being shocked.

According to a preferred embodiment, the bottom of the baffle wall has a blade-like edge that digs into the rat's torso to more effectively immobilize the rodent during the killing cycle. The baffle wall may be planar or may have a tapered or top-down diminishing thickness with the bottom or lowermost end forming the blade-like edge. The barrier could also be formed as a plurality of individual members that extend downwardly in a stalactite manner and are laterally spaced from, but sufficiently close to, one another so as to form a grate-like wall for confining the movement of a rat's body within the trap in like manner to the solid barriers described herein.

Accordingly, it is an object of the present invention to provide an electronic rat trap having a housing body that defines a trap enclosure with a ceiling and a floor, the trap floor having at least three or more plates on the floor of the rat pathway for receiving a high voltage pulse train upon activation of a killing cycle, and a barrier extending downwardly from the ceiling, a bottom end of the barrier being positioned at a specific height above the plates and in a particular longitudinal relationship therewith to prevent upward movement of a rat when its position in the trap activates the killing cycle.

Another object of the present invention is to provide an electronic rat trap in accordance with the preceding object in which the trap has three killing plates including a center ground plate flanked by front and rear high voltage plates, the lowermost edge of the bottom end of the barrier being between about 1.00 inch and about 2.50 inches, and preferably about 1.78 inches, in vertical distance above the center plate, and at least about 1.50 inches, and preferably about 2.34 inches, rearwardly of a vertical plane that extends upwardly from the forward edge of the center ground plate.

A further object of the present invention is to provide an electronic rat trap in accordance with the preceding objects in which the barrier includes a baffle wall having a blade-like lowermost edge that digs into the torso of the rodent should the rodent attempt to jump upwardly upon trap activation.

A still further object of the present invention is to provide an electronic rat trap in accordance with the preceding objects in which the baffle wall has a tapered or top-down diminishing thickness with the bottom or lowermost end narrowing to the blade-like edge.

Yet another object of the present invention is to provide an electronic rat trap in accordance with the preceding objects that is cost effective to make and use, reliable in operation, and which effectively prevents rodent escape upon initiation of a killing cycle.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

In describing the preferred embodiments, specific terminology will be resorted to for the sake of clarity. It is to be understood that each specific term includes all technical equivalents which operate in a similar manner to accomplish a similar purpose.

Figure 1:
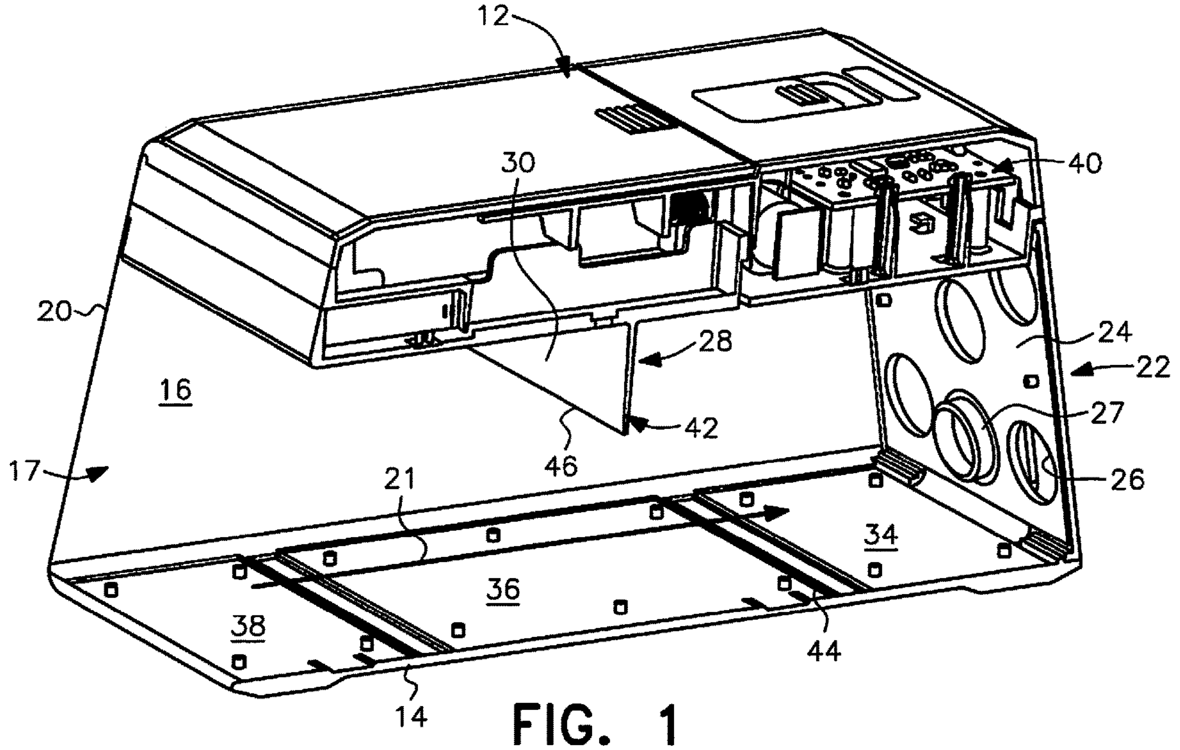
FIG. 1 is a perspective cut-away view of an electronic rat having three killing plates and a downwardly extending barrier embodied as a planar baffle wall in accordance with the present invention.
Figure 2A:
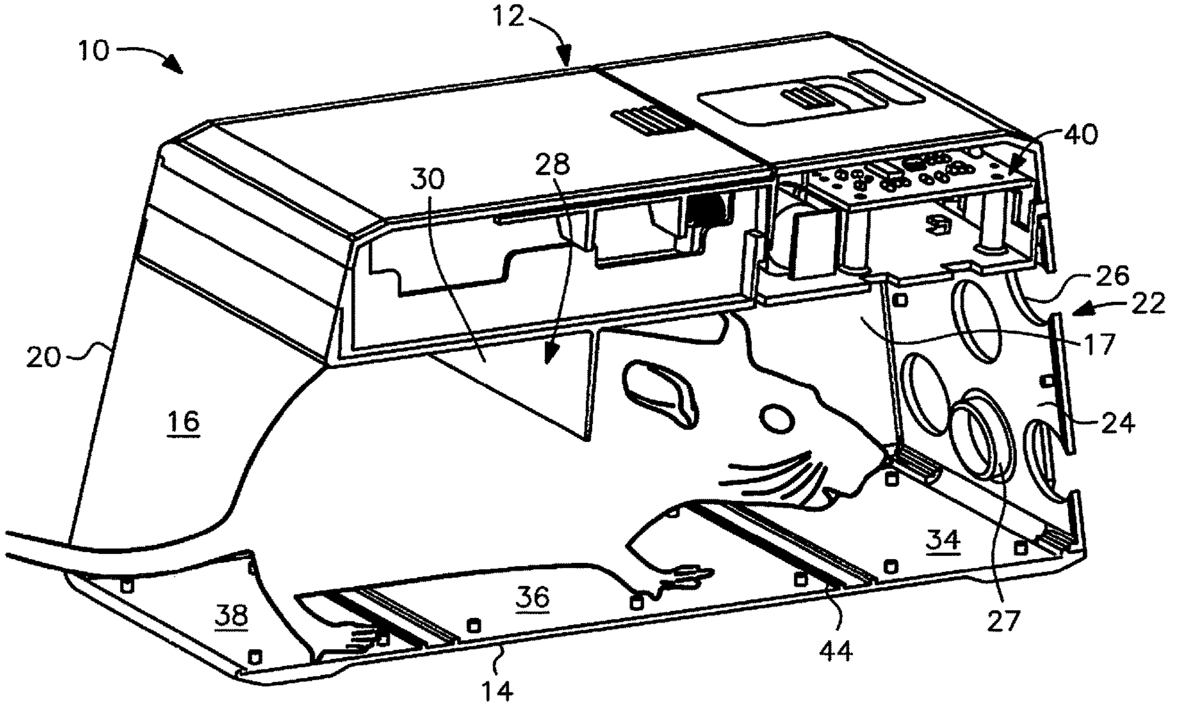
FIG. 2A shows the cut-away view of the rat trap as shown in FIG. 1 but with a rat positioned under the baffle wall and in contact with the rear and center killing plates.
Figure 2B:
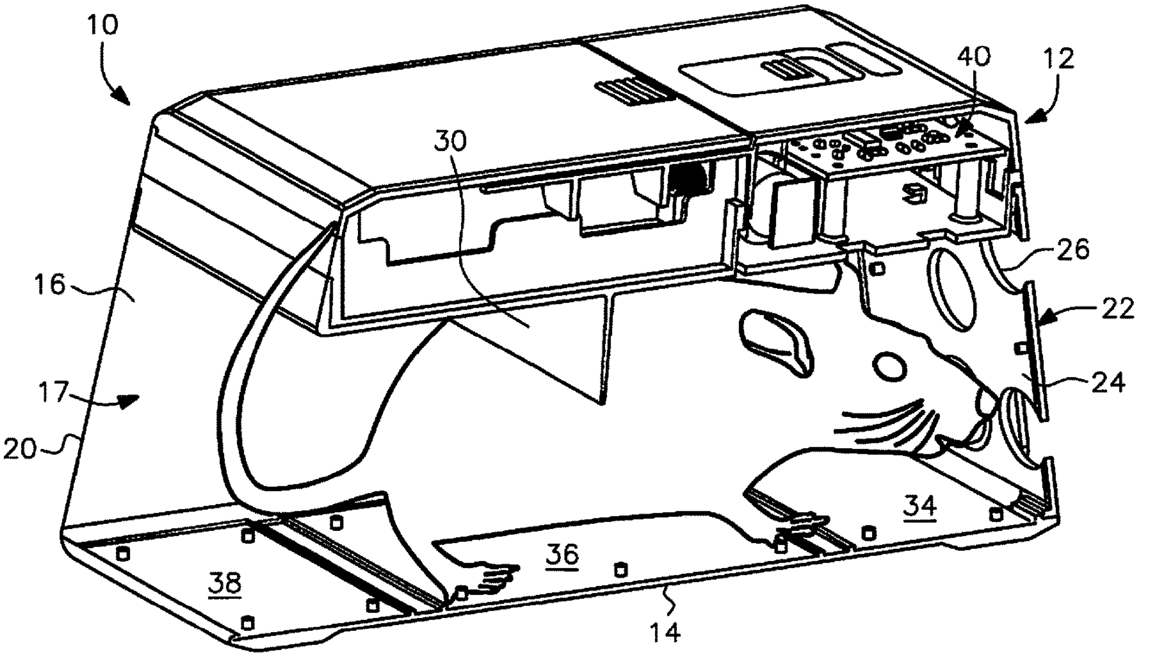
FIG. 2B shows the cut-away view of the rat trap as shown in FIGS. 1 and 2A with the rat positioned under the baffle wall but with the rat having moved further forward into the trap so that, now being in contact with the center and front killing plates, a killing cycle will be initiated.

As shown in FIGS. 1, 2A and 2B, the present invention is directed to an electronic rat trap generally designated by reference numeral 10. The rat trap includes an upper wall assembly, generally designated by reference numeral 12, and a floor 14 spaced from one another and joined by a left side 16 and a right side 18 (see FIG. 3); the right side 18 of the trap 10 has been removed in FIGS. 1, 2A and 2B in order to show the trap interior which is generally designated by reference numeral 17. As used herein, "left" and "right" have been designated with reference to the view of the trap as taken from the trap entrance end 20.

The entrance end 20 of the rat trap 10 is open to provide rats with access to the interior of the trap while the opposite baited end, generally designated by reference numeral 22, is closed by an apertured wall 24. The apertures or openings 26 in the wall 24 allow for better detection of the scent of the bait from outside the trap in order to attract nearby rats and hopefully entice the same to enter the trap through the open entrance end 20. The openings also encourage the rat, once having moved sufficiently into the trap, to move forward, i.e., toward the openings, when it starts being shocked. In the embodiment shown, one of the apertures 26 is fitted with a bait plug 27 for holding bait.

Inside the rat trap 10, at least three, and possibly more, killing plates are positioned on the floor 14 in spaced relationship to create a pathway 21 for the rat from the entrance end 20 to the baited end 22 as indicated by the arrow 21. A barrier, generally designated by reference numeral 28, extends downwardly from the trap ceiling 32 into the trap interior 17 and serves to restrict the height of the trap interior 17 to prevent upward movement of the rat at the point of the barrier. In addition, the fixed nature of the trap ceiling renders the trap impervious to any upward pressure the rat may apply to the ceiling 32, and particularly the barrier 28, should the rat make an effort to escape.

Figure 3:
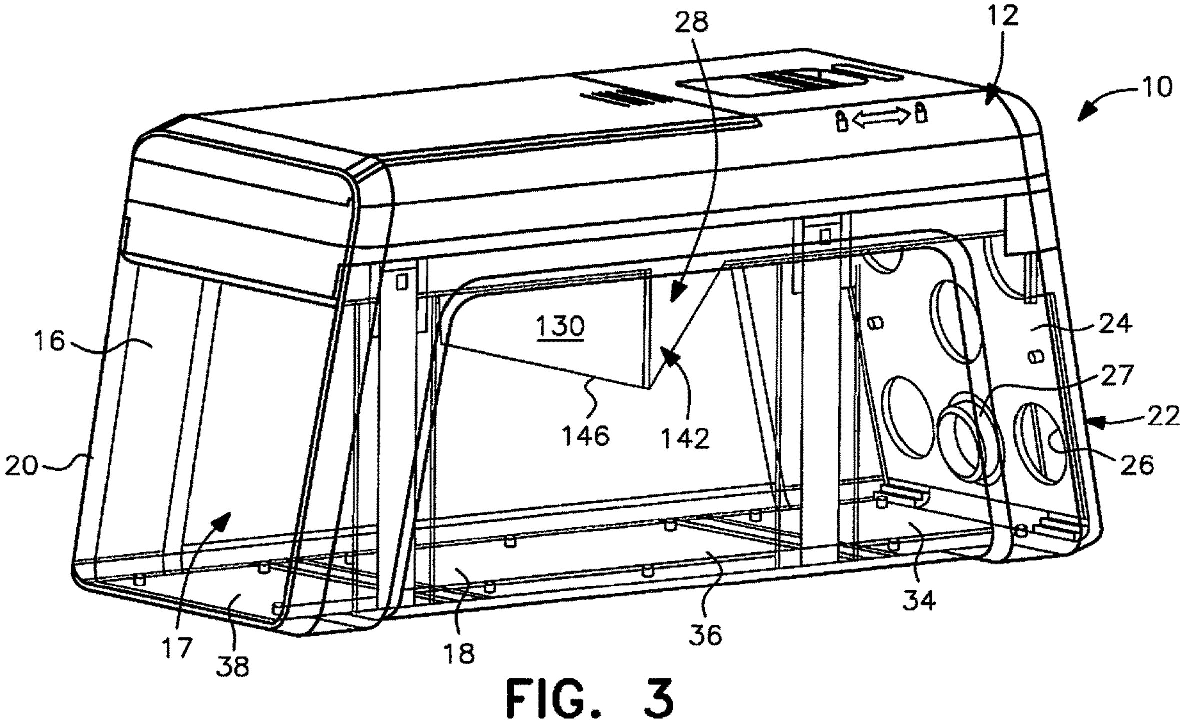
FIG. 3 is a transparent perspective view of a rat trap like that shown in FIG. 1 but with a barrier embodied as a baffle wall of diminishing thickness from top to bottom in accordance with the present invention.
Figure 4:
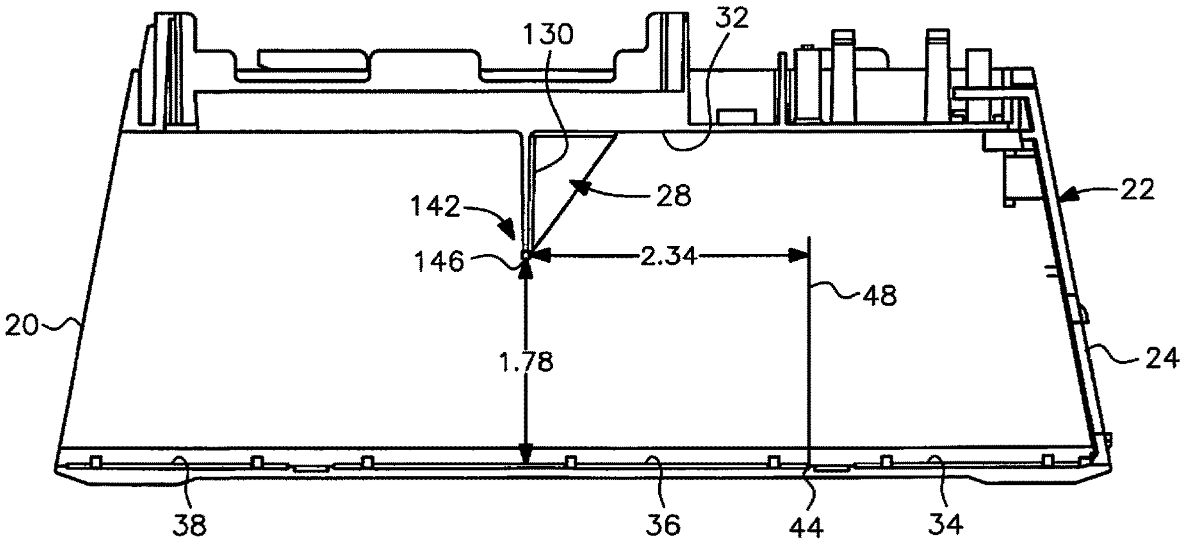
FIG. 4 is a planar side view of the rat trap shown in FIG. 3 illustrating the dimensional relationship between the bottom of the baffle wall and the killing plates.
Figure 5:
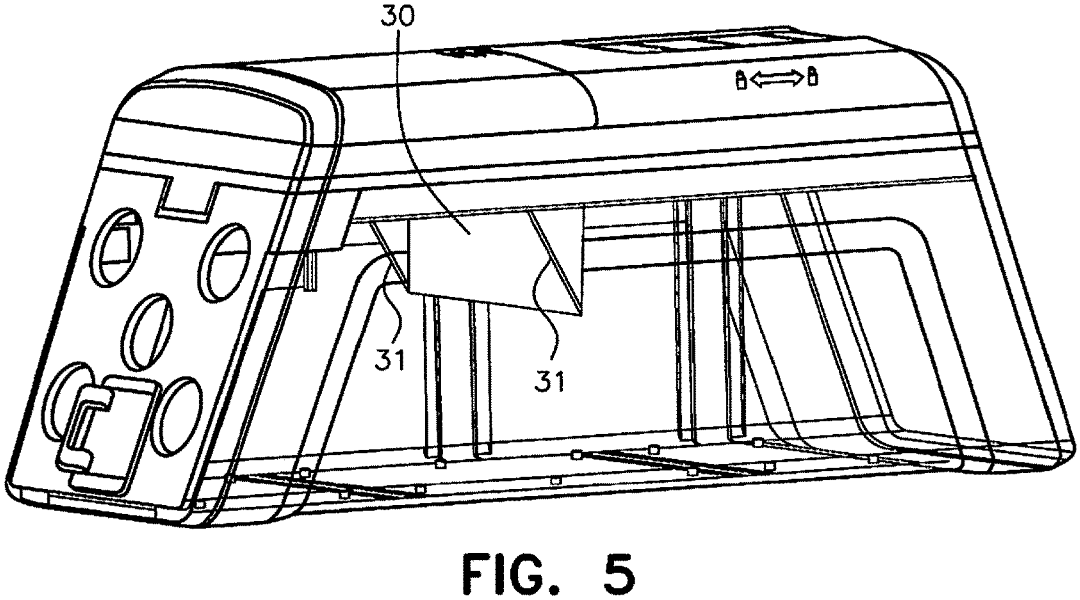
FIG. 5 is an opposite side perspective view of a rat trap like that shown in FIG. 1 but with the planar baffle wall being provided with supporting panels or ribs.
Figure 6:
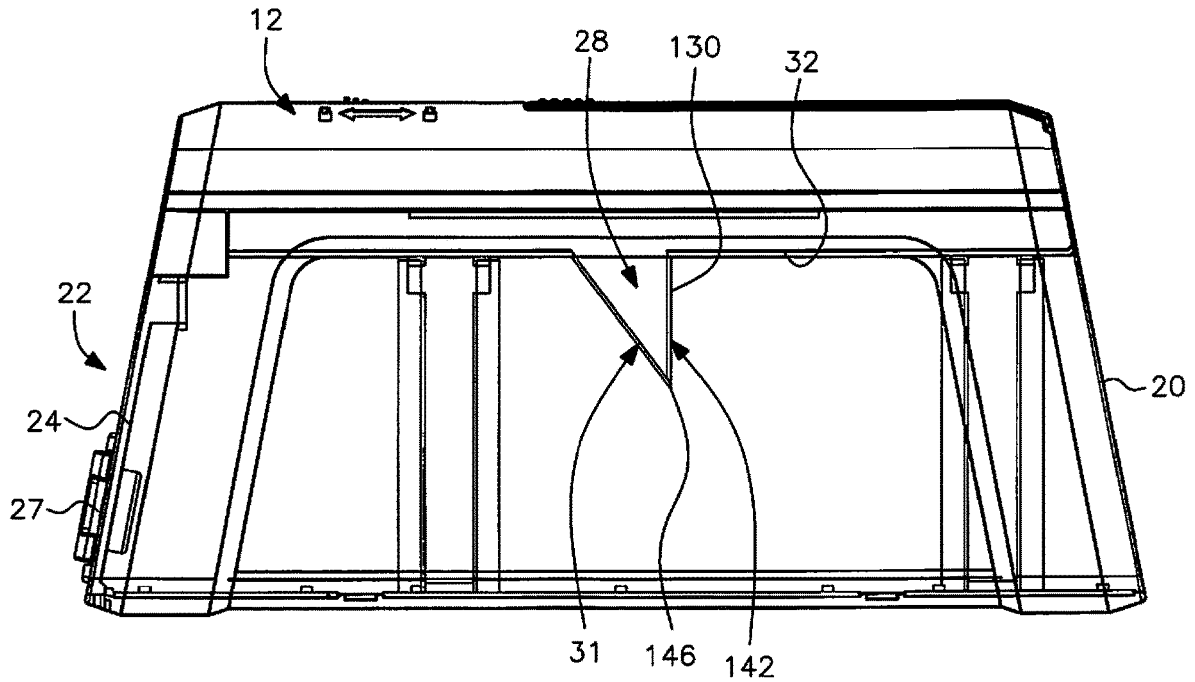
FIG. 6 is a side view of the rat trap shown in FIG. 5.
Figure 7A:
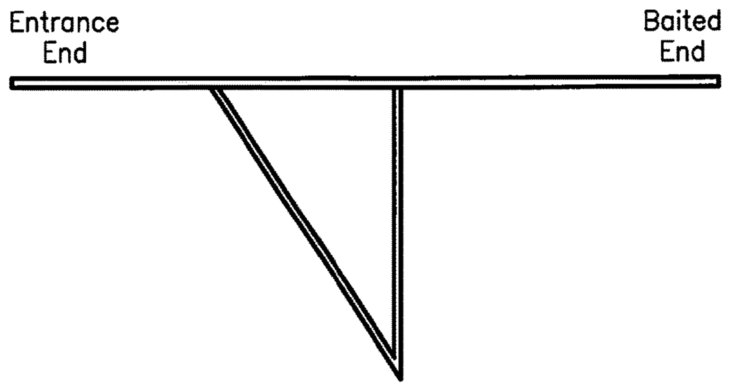
FIGS. 7A, 7B and 7C are right side views of three barriers of diminishing thickness formed as a rear-side tapered baffle, a front-side tapered baffle and a triangular baffle tapered on both the front and rear sides, respectively.
Figure 7B:
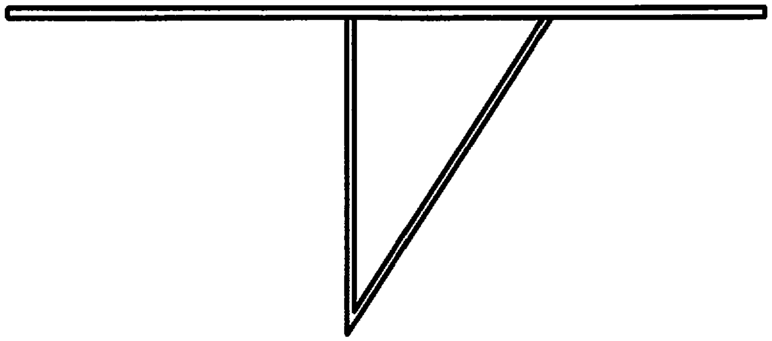
Figure 7C:
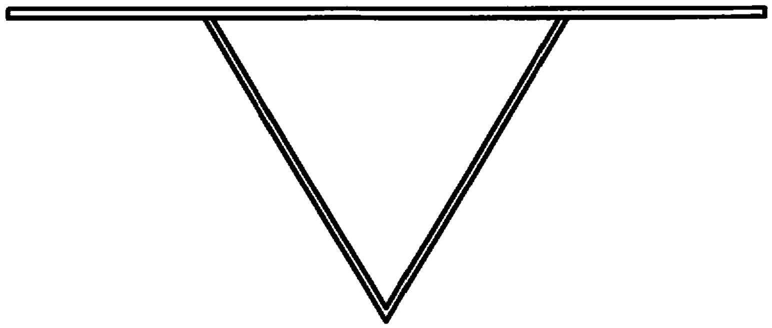
Figure 8:
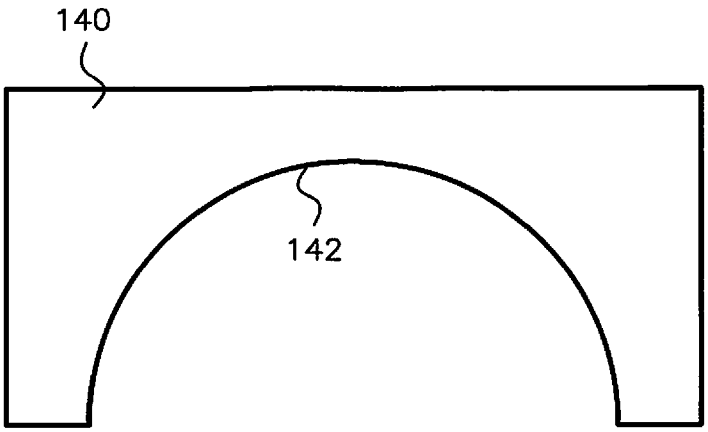
FIG. 8 is a view, as taken from either end of the trap, of an alternative barrier configuration including a generally planar wall having an arched bottom edge.
Figure 9:
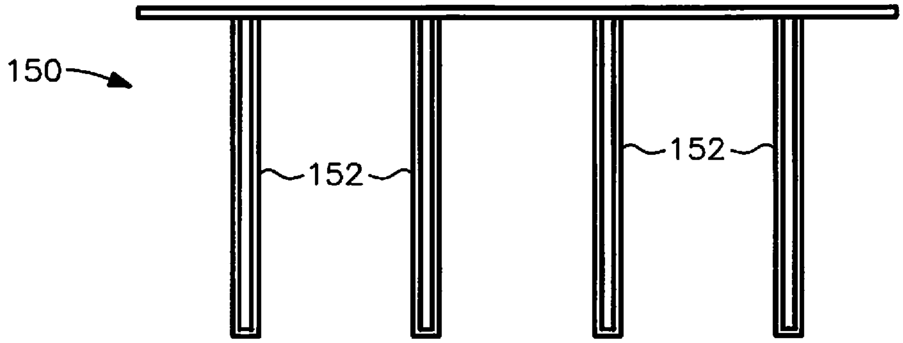
FIG. 9 is a view, as taken from either end of the trap, of another alternative barrier configuration including a plurality of members laterally spaced from one another across the width of the trap to form a grate-type baffle wall.

The barrier 28 may be embodied as a planar baffle wall (see FIGS. 1, 2A and 2B), a planar baffle wall with support ribs 31 (see FIGS. 5 and 6) or as a tapered barrier or baffle wall 130 (see FIGS. 3 and 4). As viewed from the right side of the trap, the tapered barrier may be formed as a rear-side tapered baffle as shown in FIG. 7A, a front-side tapered baffle as shown in FIG. 7B, or a triangular baffle with both the front and rear sides being tapered as shown in FIG. 7C. Alternatively, the barrier may be embodied as a generally planar wall 140 with an arched bottom edge 142 as shown in the end view of FIG. 8, as a grate type wall generally designated by reference numeral 150 having a plurality of laterally spaced members 152 as shown in the end view of FIG. 9, or with any other configuration that would serve to create a height restricting barrier in the trap interior at the specified point of barrier placement therein.

In the embodiment shown, the plurality of killing plates are positioned adjacent one another along the pathway 21 and include a first plate 34 nearest the baited end 22, a second plate 36 spaced rearwardly from the first plate 34, and a third plate 38 spaced rearwardly from the second plate 36 to be nearest the entrance end 20. The first and second plates 34, 36 are the active plates which, when connected through contact with both by a known impedance such as a rat, initiate activation of a high voltage output circuit generally designated by reference numeral 40. The third plate 38 is electrically connected to the first plate 34 and automatically goes to the voltage level of the first plate 34 when the circuit 40 is activated in the manner described in the '466 patent previously incorporated by reference herein.

The barrier 28 embodied as baffle wall 30, 130 is positioned along the longitudinal length of the trap so that the downward projection of the barrier 28 from the ceiling 32 is above the second or center plate 36. In the embodiment shown in FIGS. 1-2B, the planar baffle wall 30 is sized so that a bottom end generally designated by reference numeral 42 thereof is positioned with the blade-like bottom edge 46 at a specific height above the plates and at a specific longitudinal distance from the forward edge 44 of the center ground plate 36.

According to a preferred embodiment shown in FIGS. 3 and 4, the baffle wall 130 has a diminishing thickness as it extends downwardly from the ceiling 32, with the bottom end 142 of the baffle tapering to a blade-like lowermost edge 146. As shown in FIGS. 7A-7C, the diminishing thickness may be achieved with a rear-side tapered baffle (FIG. 7A), a front-side tapered baffle (FIG. 7B) or a triangular baffle having both the front and rear sides tapered (FIG. 7C).

In the embodiment shown in FIG. 4, the positioning of the barrier 28 in the trap interior 17, whether embodied as a planar baffle wall 30 or a tapered baffle wall 130, provides a vertical distance between the lowermost edge 46, 146 of the baffle wall 30, 130 and the second or center plate 36 of between about 1.0 inch and about 2.5 inches, and preferably about 1.78 inches. The horizontal distance between the lowermost edge 46, 146 of the bottom end 42, 142 of the baffle wall and a vertical plane 48 that extends upwardly from and in alignment with the forward edge 44 of the center plate is at least 1.5 inches, preferably at least 1.75 inches, and more preferably is about 2.34 inches. With this positioning of the barrier relative to the center plate, and upon any upward movement of the rat when it starts being shocked, the barrier will contact the rat behind the middle of its back to prevent the rat from pushing off of the front plate.

In use, the rat enters the trap 10 through the entrance end 20 and moves along the pathway 21 toward the baited end 22 as shown in FIG. 2A. When the rat has moved sufficiently forwardly into the trap interior 17 to contact the first or forward high voltage plate 34 and the center ground plate 36 simultaneously, as shown in FIG. 2B, the circuit 40 is activated to deliver a high voltage pulse train to the first and second plates 34, 36. Upon activation of the first plate, the third plate 38 becomes energized a few milliseconds later. As evident from FIG. 2B, the position of the rat when the killing cycle is activated is such that, upon any upward movement of the rat, the bottom edge 46, 146 of the baffle wall 30, 130 restricts the torso of the rat between the floor 14 of the trap and the baffle wall 30, 130 so that the rat cannot jump upward or push off from the front plate in an effort to move rearwardly and escape electrocution. In addition, unlike traps having hinged covers like that shown in the '899 patent, the fixed nature of the trap ceiling of the rat trap according to the present invention renders the trap impervious to any upward pressure the rat may apply in its efforts to escape.

The foregoing descriptions and drawings are illustrative of the principles of the invention. The invention may be configured in other shapes, and other configurations of the present invention may occur to those skilled in the art. Therefore, it is not desired to limit the invention to the specific examples disclosed. Rather, all suitable modifications and equivalents may be resorted to, falling within the scope of the invention.

What is claimed is:

1. An electronic rodent trap, comprising:

a trap body including an upper wall assembly and a floor spaced from one another and joined by a left side and a right side, the upper wall assembly forming a fixed ceiling for the trap body, the trap body having an open entrance end to provide rodents with access to an interior of the trap and a closed baited end opposite the entrance end;

a high voltage killing circuit including at least three killing plates positioned on the floor in a spaced relationship to create a pathway for a rodent from the entrance end to the baited end, the plates including a first plate nearest the baited end, a second plate nearest the entrance end, and a center plate positioned between the first and second plates; and a barrier, including a planar baffle wall extending downwardly from the trap ceiling into the trap interior, a bottom edge of the barrier being positioned above the center plate, a vertical distance between the bottom edge of the barrier and the center plate is greater than or equal to 1.0 inch and less than or equal to about 2.5 inches, the barrier is positioned relative to the center plate in the horizontal and vertical directions such that upon any upward movement of the rodent resulting from activation of the high voltage killing circuit, the bottom edge of the barrier will contact the rodent to prevent the rodent from pushing off of the first plate.

2. The electronic rodent trap as set forth in claim 1, wherein a horizontal distance between the bottom edge of the barrier and a vertical plane that extends upwardly from and in alignment with a forward edge of the center plate is at least 1.5 inches, the forward edge of the center plate being nearest the baited end.

3. The electronic rodent trap as set forth in claim 1, wherein the closed baited end is provided with apertures to allow for better scent detection of bait placed at the baited end from outside the trap, wherein one of the apertures is fitted with a bait plug for holding bait.

4. The electronic rodent trap as set forth in claim 1, wherein the first and center plates are active plates which, when connected through contact with both by a rodent having a known impedance, initiate the activation of the high voltage killing circuit, the second plate being electrically connected to the first plate.

5. The electronic rodent trap as set forth in claim 1, wherein the barrier is angled away from a forward edge of the center plate.

6. The electronic rodent trap of claim 1, wherein the barrier includes at least one support rib extending downwardly from the ceiling, the at least one support rib defined by a first side continuously and linearly tapering from the ceiling of the trap body toward the entrance end and the bottom edge of the barrier.

7. The electronic rodent trap as set forth in claim 6, wherein the at least one support rib extends between the ceiling of the trap body and to the bottom edge of the barrier.

8. The electronic rodent trap as set forth in claim 7, wherein the at least one support rib extends orthogonally from a rear facing side of the planar baffle and toward the baited end of the trap.

9. The electronic rodent trap as set forth in claim 8, wherein the at least one support rib comprises a first support rib arranged on a first side of the barrier and a second support rib arranged on a second side of the barrier opposite the first side.

10. The electronic rodent trap of claim 1, wherein the barrier restricts a height of the trap interior and the fixed nature of the trap ceiling renders the trap impervious to any upward pressure the rodent applies to the barrier in attempting to escape.

11. An electronic rodent trap, comprising:

a trap body including an upper wall assembly and a floor spaced from one another and joined by a left side and a right side, the upper wall assembly forming a fixed ceiling for the trap body, the trap body having an open entrance end to provide rodents with access to an interior of the trap and a closed baited end opposite the entrance end;

a high voltage killing circuit including at least three killing plates positioned on the floor in a spaced relationship to create a pathway for a rodent from the entrance end to the baited end, the plates including a first plate nearest the baited end, a second plate nearest the entrance end, and a center plate positioned between the first and second plates; and a barrier defining a grated wall including a plurality of fixed, linear, laterally spaced apart members each having a constant thickness and extending downwardly from the trap ceiling into the trap interior, a bottom edge of the laterally spaced apart members being positioned above the center plate, the barrier positioned to prevent upward movement of the rodent at the point of the barrier, wherein a vertical distance between the bottom edge of the barrier and the center plate is greater than or equal to 1.0 inch and less than or equal to about 2.5 inches.

* * * * *